(12) United States Patent
Stout et al.

(10) Patent No.: US 7,648,278 B2
(45) Date of Patent: Jan. 19, 2010

(54) HIGH SPEED AEROSPACE GENERATOR RESILIENT MOUNT, COMBINED CENTERING SPRING AND SQUEEZE FILM DAMPER

(75) Inventors: David E. Stout, Tucson, AZ (US); Balwinder S. Birdi, Tucson, AZ (US); Edward M. Down, Tucson, AZ (US); Walter L. Meacham, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 492 days.

(21) Appl. No.: 11/620,287

(22) Filed: Jan. 5, 2007

(65) Prior Publication Data

US 2008/0166076 A1  Jul. 10, 2008

(51) Int. Cl.
    *F16C 27/00* (2006.01)
(52) U.S. Cl. .......................... 384/99; 384/535
(58) Field of Classification Search ............ 384/99, 384/535, 581
    See application file for complete search history.

(56) References Cited

U.S. PATENT DOCUMENTS

| 4,213,661 A | 7/1980 | Marmol |
| 4,553,855 A | 11/1985 | De Choudhury |
| 4,872,767 A | 10/1989 | Knapp |
| 4,952,076 A * | 8/1990 | Wiley et al. ............ 384/99 |
| 4,971,458 A | 11/1990 | Carlson |
| 4,981,415 A | 1/1991 | Marmol |
| 5,067,825 A | 11/1991 | Vance |
| 5,085,521 A | 2/1992 | Singh |
| 5,380,100 A | 1/1995 | Yu |
| 5,531,522 A | 7/1996 | Ide |
| 5,603,574 A | 2/1997 | Ide et al. |
| 6,682,219 B2 | 1/2004 | Alam et al. |
| 6,747,383 B2 | 6/2004 | Tornquist et al. |
| 2006/0204153 A1 * | 9/2006 | Alam et al. ............ 384/99 |

FOREIGN PATENT DOCUMENTS

| GB | 2216609 A | 10/1898 |
| GB | 2173867 | 10/1986 |
| WO | WO2006018915 | 2/2006 |
| WO | WO2006051361 | 5/2006 |

OTHER PUBLICATIONS

EPO Search Report and Opinion, May 27, 2008.

* cited by examiner

*Primary Examiner*—Thomas R Hannon
(74) *Attorney, Agent, or Firm*—Oral Caglar, Esq.

(57) ABSTRACT

A rotor mount assembly for an electrical machine, such as a high speed aerospace generator, comprises a spring having a simple annular structure together with an oil squeeze film damper (SFD). The spring is engineered to move the rotor critical speeds outside of the extremes of the operating speed range and the SFD damps out the rotor responses as the speed passes through these points.

13 Claims, 9 Drawing Sheets

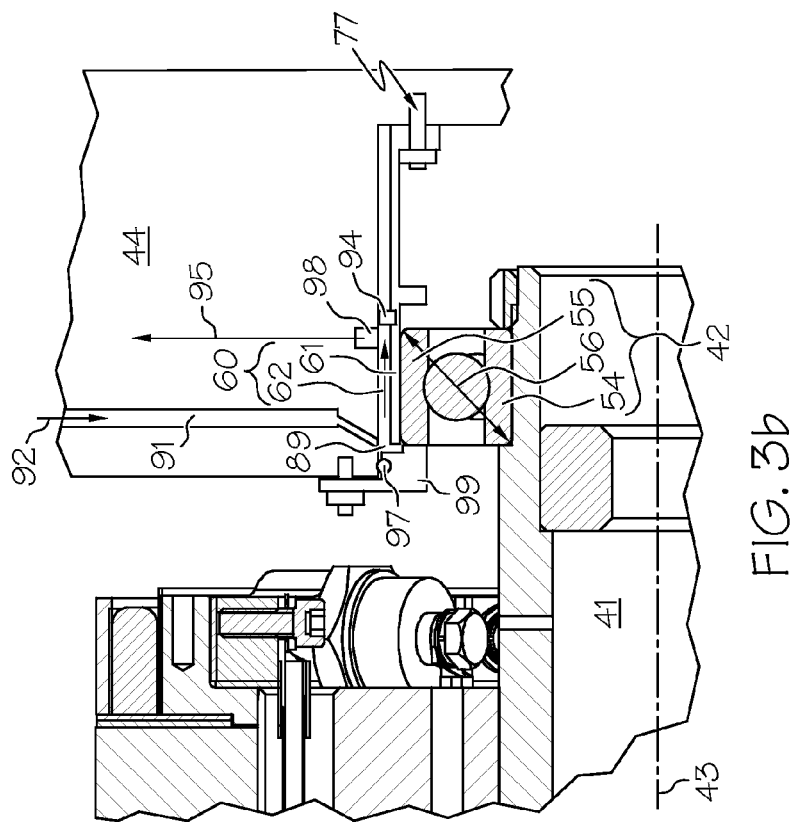
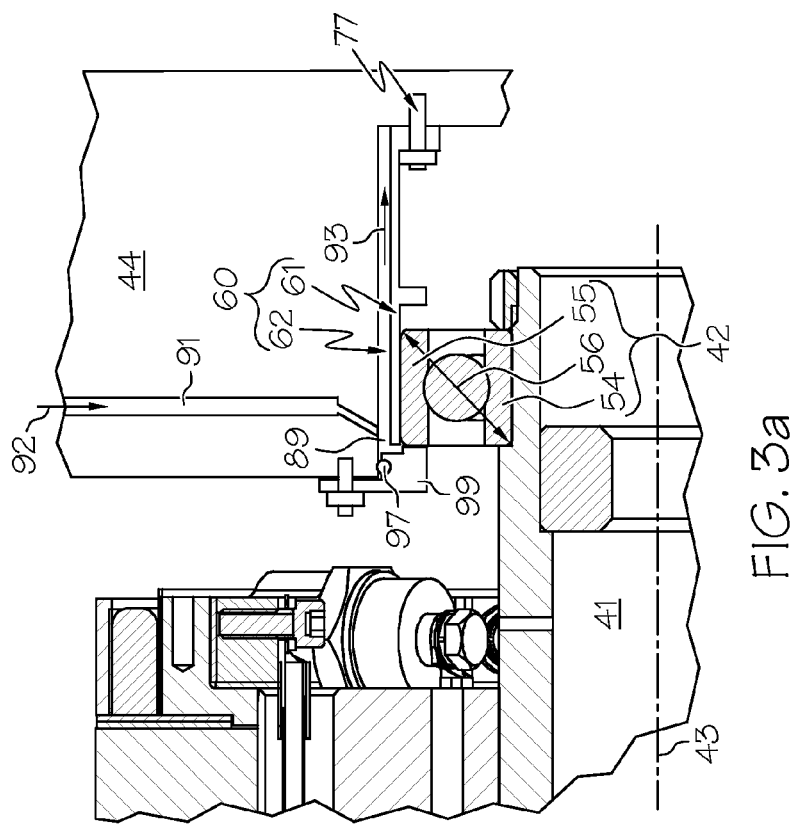
FIG. 3a
FIG. 3b

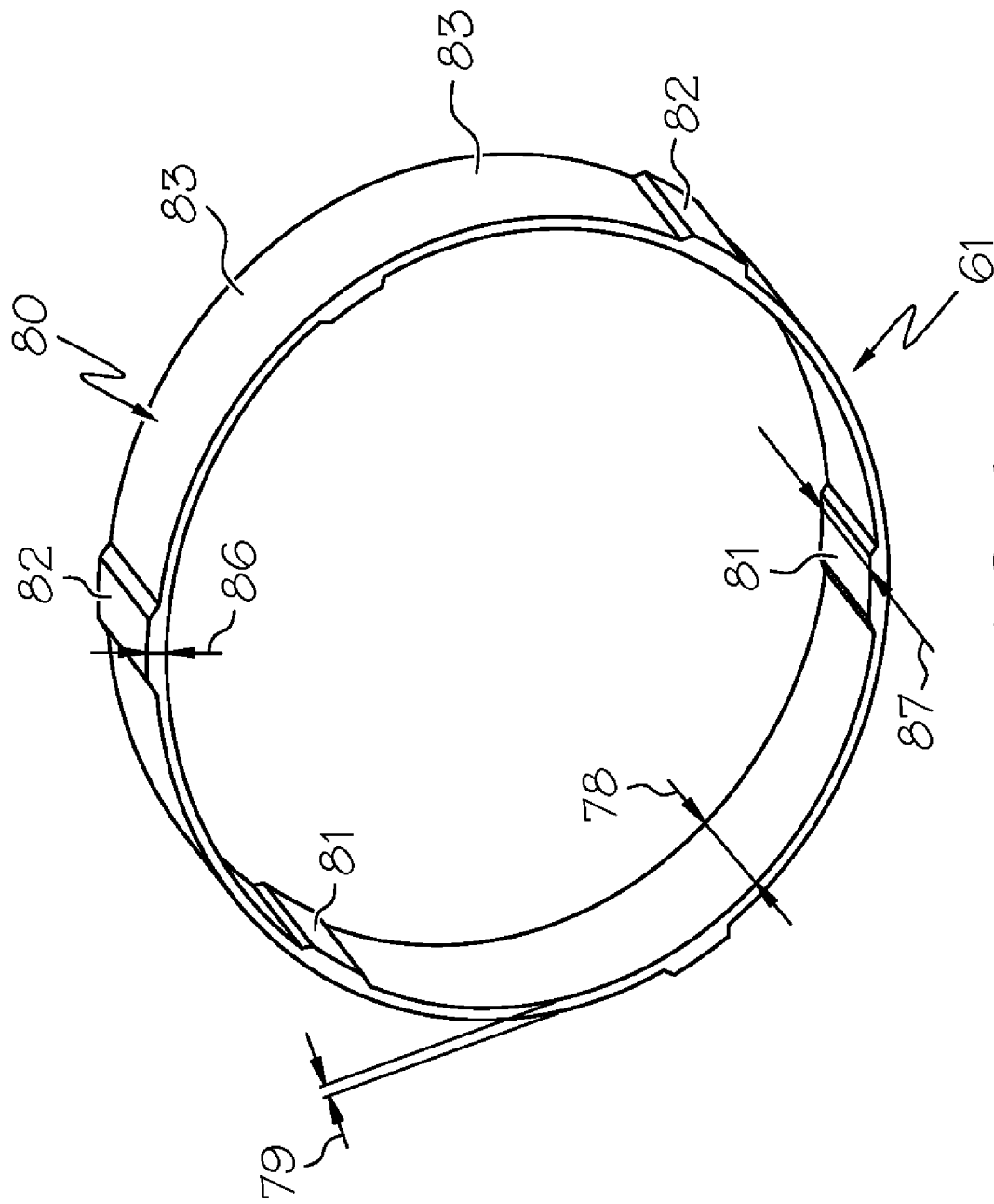

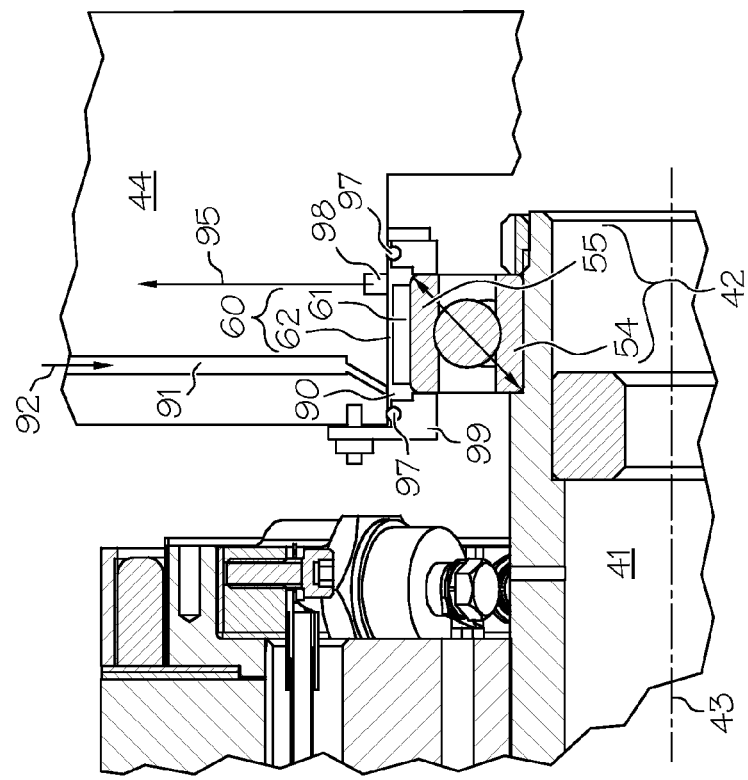
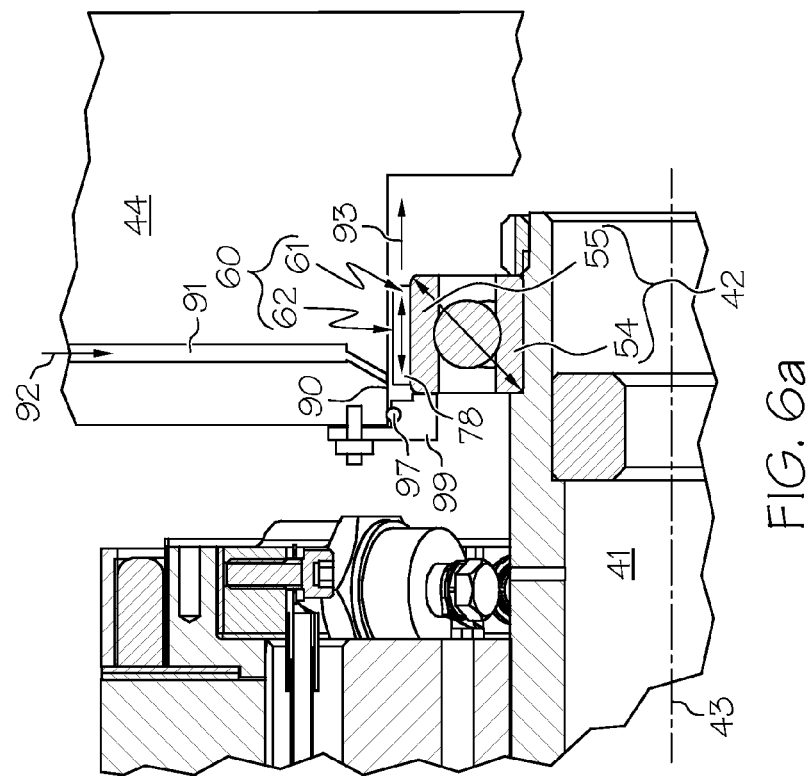

HIGH SPEED AEROSPACE GENERATOR RESILIENT MOUNT, COMBINED CENTERING SPRING AND SQUEEZE FILM DAMPER

BACKGROUND OF THE INVENTION

The present invention generally relates to electrical machines, such as high speed aerospace generators and motors, and, more particularly, to mounting assemblies that interface between the bearing assemblies of the rotor shaft and the support housing of the electrical machines.

Aircraft systems include various types of rotating electrical machines, such as alternating current (AC) motors and generators of various designs. Generally, the electrical machine includes a rotor and a stator. The rotor is part of a rotating shaft assembly supported by bearings. The stator is part of a static assembly that supports the rotor. For current electrical machines, the bearings are directly mounted to the static structure, often referred to as the housing, or have a hydraulic damper between the bearing outer race and the housing mounting bore (see U.S. Pat. No. 6,747,383).

If the machine is operated as a motor, electrical power is supplied to the stator to develop a rotating electrical field. This rotating electrical field generates a torque in the rotor causing it to rotate. If the machine is operated as a generator, electrical power is supplied to the rotor to generate a magnetic field. The generated magnetic field rotates as the rotor rotates. This rotating magnetic field induces a voltage across the stator, which supplies electrical power to a load.

The future direction of aerospace quality electric power systems is towards higher power, higher speed, lighter weight, variable frequency electric generators and starter generators. Variable frequency generators rotate throughout a range of speeds within an operating speed range. For high speed aerospace generators, the operating speed range is typically 7,200 to 30,000 rpm. Potentially large centrifugal forces can be imposed on the rotors of generators operating at such speeds. The generator rotors must be precisely balanced to avoid vibration, which may lead to deviation of the rotor shaft axis from its intended axis of rotation. Practically achieving and maintaining this precision balance can be difficult due to variations in the manufacture and assembly process. The amplitudes of vibrations resulting from rotor out of balance can be significant if the rotor's rotational speed reaches its resonance speed, or a multiple of its resonant speed. Such speeds are generally referred to as "critical speeds". Rotor critical speed and machine response is a function of several variables including the rotor mass, the distribution of that mass, the flexibility of the shaft, the bearing support locations and the stiffness of the rotor, bearings, housing and interface.

Typical aerospace generators and starter generators employ rolling element bearings, which have very high stiffness and little damping. If an unbalanced rotor is rotating for prolonged periods of time at one of its critical speeds, it may be damaged, even catastrophically. If one or more of the rotor critical speeds are below the operating range, to avoid damage, the rotor may be quickly brought through a critical speed into the operating speed range. If the critical speed is well damped, the rotor may pass through the critical speed slowly without experiencing high excursions or bearing loads.

In U.S. Pat. No. 4,553,855, a support assembly for a rotating shaft is disclosed. The support assembly comprises a spring and a squeeze film damper (SFD). The support assembly uses a series of support rods spaced on the interior and exterior sides of an annular spring to define spring segments that act as the spring for supporting the journal. The SFD comprises a cavity incorporated either as part of the spring support structure or separately within the assembly. Although the described assemblies may be used to provide the necessary damping, the positioning of the plurality of support rods increases installation time.

In U.S. Pat. No. 5,603,574, a fluid-damped support for a bearing is disclosed. The fluid-damped support comprises a spring and a squeeze film damper (SFD). The described support utilizes a unique combination of springs and dampers as an integral part of the bearing support structure. Radial structural members form the springs and cavities filled with oil form the dampers. Although the described support may limit or damp out the vibrations occurring when the supported member passes through natural frequencies before reaching operating speed, the '574 patent design is complex, requires radial and axial space for implementation and can only be tuned during design for a particular application.

As can be seen, there is a need for a support assembly for an electrical machine rotor that can move the rotor critical speeds outside of the extremes of the operating speed range and that can damp out the rotor responses as the rotor passes through these critical speeds. Further, there is a need for a rotor mounting system that has a simple design and that is easy to manufacture and install.

SUMMARY OF THE INVENTION

In one aspect of the present invention, an assembly for an electric machine having a rotor shaft, a bearing assembly and a support housing comprises a spring member, the spring member having an annular structure that receives the bearing assembly; and a supply of oil that forms a squeeze film damper for the rotor shaft, the supply of oil in contact with the annular structure.

In another aspect of the present invention, an assembly for an electric machine having a rotor shaft, a bearing assembly and a support housing comprises a tube spring having an annular structure and a flange, the annular structure positioned radially outward from the bearing assembly, the flange fixed to the support housing; and a squeeze film damper formed by a gap between an inner diameter surface of the support housing and an outer diameter surface of the annular structure.

In a further aspect of the present invention, an assembly for an electric machine having a rotor shaft, a bearing assembly and a support housing comprises a ring spring comprising an annular structure, a plurality of inner lobes and a plurality of outer lobes, said inner lobes integral to and positioned radially inward from said annular structure, said outer lobes integral to and positioned radially outward from said annular structure; and a supply of oil in contact with said ring spring such that a squeeze film damper is formed.

These and other features, aspects and advantages of the present invention will become better understood with reference to the following drawings, description and claims.

BRIEF DESCRIPTION OF THE DRAWINGS

FIG. 3a is a plan view of a rotor mount assembly having a tube spring and an open end feed mount according to one embodiment of the present invention;

FIG. 3b is a plan view of a rotor mount assembly having a tube spring and a re-circulating end feed mount according to one embodiment of the present invention;

FIG. 5 is a perspective view of a lobed spring member according to one embodiment of the present invention;

FIG. 6a is a plan view of a rotor mount assembly having a lobed centering spring and an open end feed mount with no axial spring on the bearing according to one embodiment of the present invention;

FIG. 6b is a plan view of a rotor mount assembly having a lobed centering spring and a re-circulating end feed mount with no axial spring on the bearing according to one embodiment of the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides mount assemblies for rotors of electrical machines, such as high speed aerospace generators, and methods for mounting rotors. Embodiments of the present invention may interface between the bearing assemblies and the support housing of the electrical machine. In one embodiment, the present invention may comprise a spring and a squeeze film damper (SFD) positioned between the rolling element bearing and the housing of the generator. The design of the spring may be engineered to move the rotor critical speeds outside of the extremes of the operating speed range, and the SFD may be used to damp out the rotor responses as the speed passes through these points. Embodiments of the present invention may find beneficial use in many industries including aerospace, automotive, and electricity generation. Embodiments of the present invention may be beneficial in applications including various types of rotating electrical machines for aircraft such as, for example, generators, motors, and motor/generators. Motor/generators may be used as starter-generators in some aircraft, since this type of rotating electrical machine may be operated as either a motor or a generator. Embodiments of the present invention may be useful in any electrical machine application.

Unlike the prior art combined spring and SFD assemblies that include support rods to provide spring deflection, one embodiment of the present invention may comprise a simple annular ring with integral lobes spaced around the circumference at the inside and outside diameters to form spring elements between the lobes. Unlike the prior art that includes complex structural members to form the springs and cavities filled with oil to form the dampers, embodiments of the present invention can comprise a tube spring integral to the outer race of the bearing and a SFD between the tube spring and the generator housing.

Figure 1:
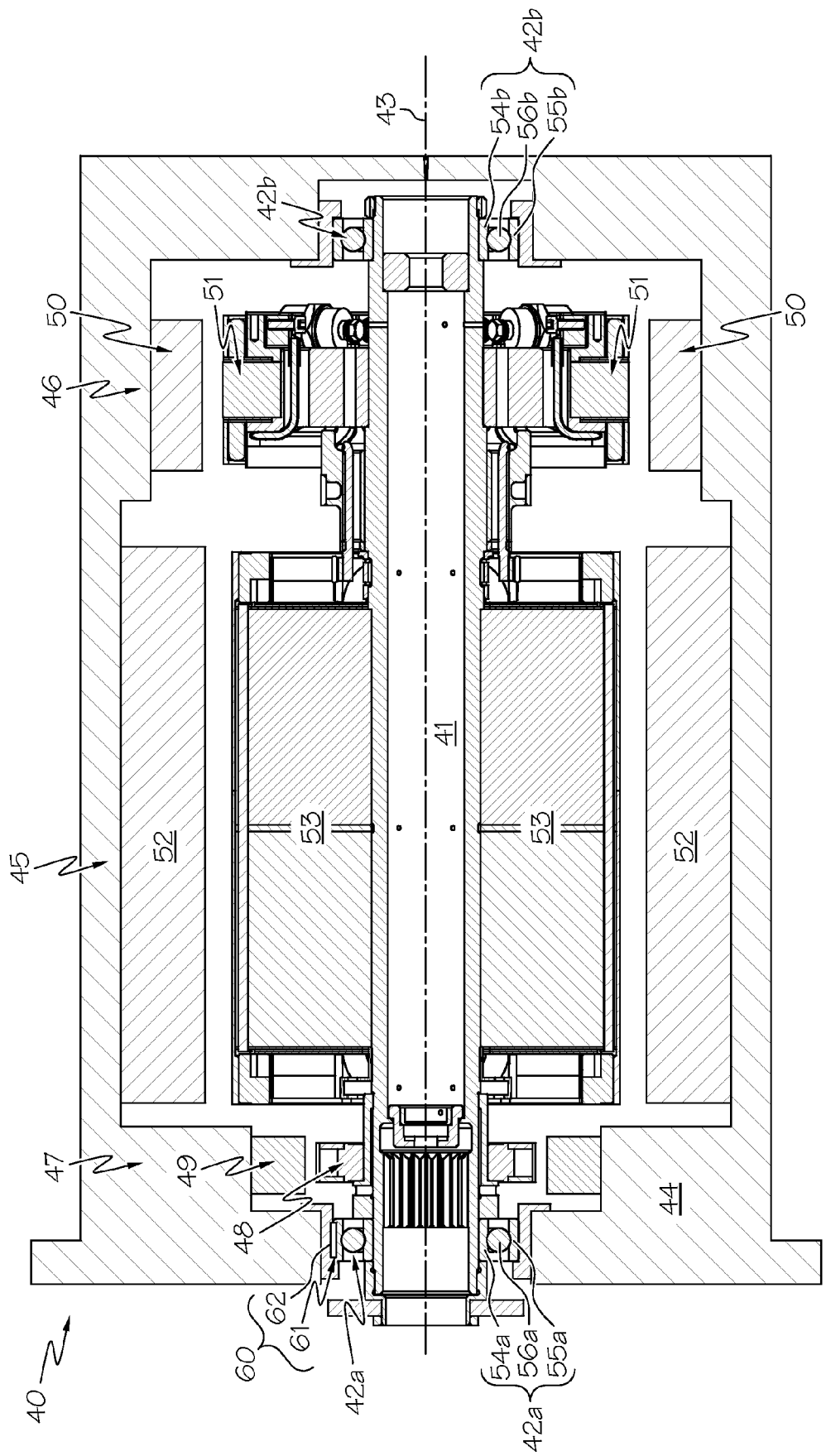
FIG. 1 is a schematic diagram of a wound rotor generator according to one embodiment of the present invention.

In one embodiment, the present invention may comprise a rotor mount assembly 60 for an electrical machine, such as but not limited to a wound rotor generator 40, as depicted in FIG. 1. The wound rotor generator 40 may comprise a main rotor shaft 41, two bearing assemblies 42 (a drive end bearing assembly 42a and an anti-drive end bearing assembly 42b) and a support housing 44. The main rotor shaft 41 may be positioned between and in contact with the drive end bearing assembly 42a and the anti-drive end bearing assembly 42b. The main rotor shaft 41, the drive end bearing assembly 42a and the anti-drive end bearing assembly 42b may be disposed within the support housing 44. The rotor mount assembly 60 may be positioned at the interface between the support housing 44 and the bearing assembly 42 (the drive end bearing assembly 42a or the anti-drive end bearing assembly 42b). For some embodiments (not depicted), one rotor mount assembly 60 may be positioned at the interface between the support housing 44 and the drive end bearing assembly 42a and another rotor mount assembly 60 may be positioned at the interface between the support housing 44 and the anti-drive end bearing assembly 42b.

The wound rotor generator 40 may include a main generator 45, an exciter generator 46, and a permanent magnet generator (PMG) 47 positioned along the main rotor shaft 41. The main generator 45 may be positioned between the PMG 47 and the exciter generator 46, as depicted in FIG. 1. Alternatively, the exciter generator 46 may be positioned between the main generator 45 and the PMG 47 (not depicted).

Magnets may be included on a PMG rotor 48 of the PMG 47. When the PMG rotor 48 rotates, AC currents may be induced in PMG stator windings 49 of the PMG 47. These AC currents may be fed to a regulator or a control device (not shown), which in turn outputs a DC current. This DC current may be provided to exciter stator windings 50 of the exciter generator 46. As an exciter rotor 51 of the exciter generator 46 rotates, three phases of AC current may be induced in the exciter rotor windings 51. Rectifier circuits (not shown) that rotate with the exciter rotor 51 may rectify this three-phase AC current, and the resulting DC currents may be provided to the main rotor windings 53 of the main generator 45. Finally, as a wound rotor laminated core 53 of the main generator 45 rotates, three phases of AC current may be typically induced in the main stator windings 52, and this three-phase AC output can then be provided to a load such as, for example, electrical aircraft systems.

The drive end bearing assembly 42a and the anti-drive end bearing assembly 42b may support the main rotor shaft 41, as depicted in FIG. 1. The drive end bearing assembly 42a may comprise an inner race 54a, an outer race 55a and a rolling element 56a. The anti-drive end bearing assembly 42b may comprise an inner race 54b, an outer race 55b and a rolling element 56b. The rolling elements 56a, 56b may comprise conventional rolling elements, such as balls, rollers etc.

Figure 2B:
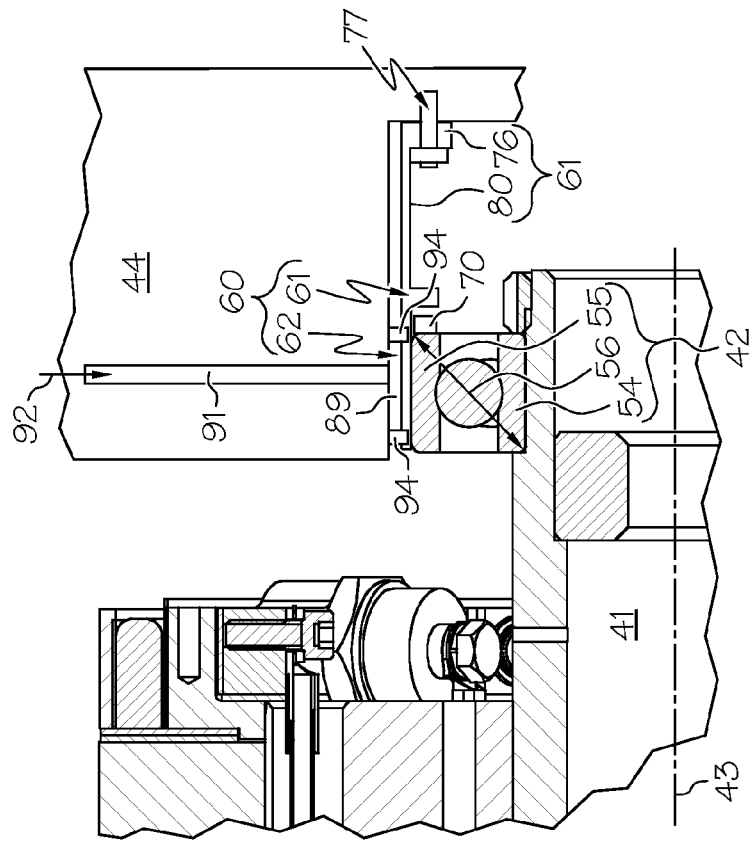
FIG. 2b is a plan view of a rotor mount assembly having a tube spring and a restricted center feed mount according to one embodiment of the present invention.
Figure 2A:
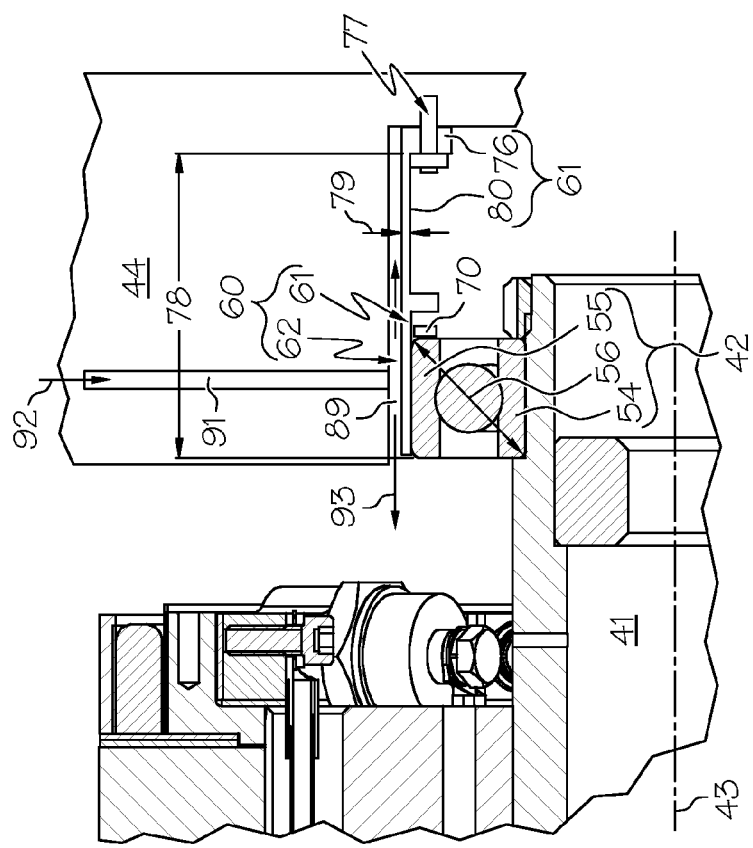
FIG. 2a is a plan view of a rotor mount assembly having a tube spring and an open center feed mount according to one embodiment of the present invention.

For some embodiments, as depicted in FIGS. 2a and 2b, the bearing assembly 42 may be in contact with the rotor mount assembly 60 and may include an axial spring 70 to provide axial loading to the bearing pair (drive end bearing assembly 42a together with anti-drive end bearing assembly 42b). In alternate embodiments, the bearing assembly 42 may be in contact with the rotor mount assembly 60 and may not be designed to provide the axial load, as depicted in FIGS. 3a and 3b. In these embodiments, the bearing pair may be axially loaded by the other bearing assembly (not shown) of the bearing pair.

The rotor mount assembly 60 may comprise a spring member 61 and a squeeze film damper 62, as depicted in FIG. 1. The inner race 54 (54a, 54b) may be fixed with the main rotor shaft 41, as depicted in FIGS. 2a and 2b. For some applications, the outer race 55 (55a, 55b) may be in contact with the spring member 61 of the rotor mount assembly 60, as depicted in FIGS. 3a and 3b. In alternate embodiments, the outer race 55 may be integral to the spring member 61 of the rotor mount assembly 60, as depicted in FIG. 4.

The spring member 61 may include an annular structure 80, as depicted in FIG. 5. The annular structure 80 may be in contact with and positioned radially outward from the outer race 55, as depicted in FIGS. 2a and 2b. Alternatively, the annular structure 80 may be integral to the outer race 55, as depicted in FIG. 4. The spring member 61 may include tube springs and ring springs, as described below.

Figure 4:
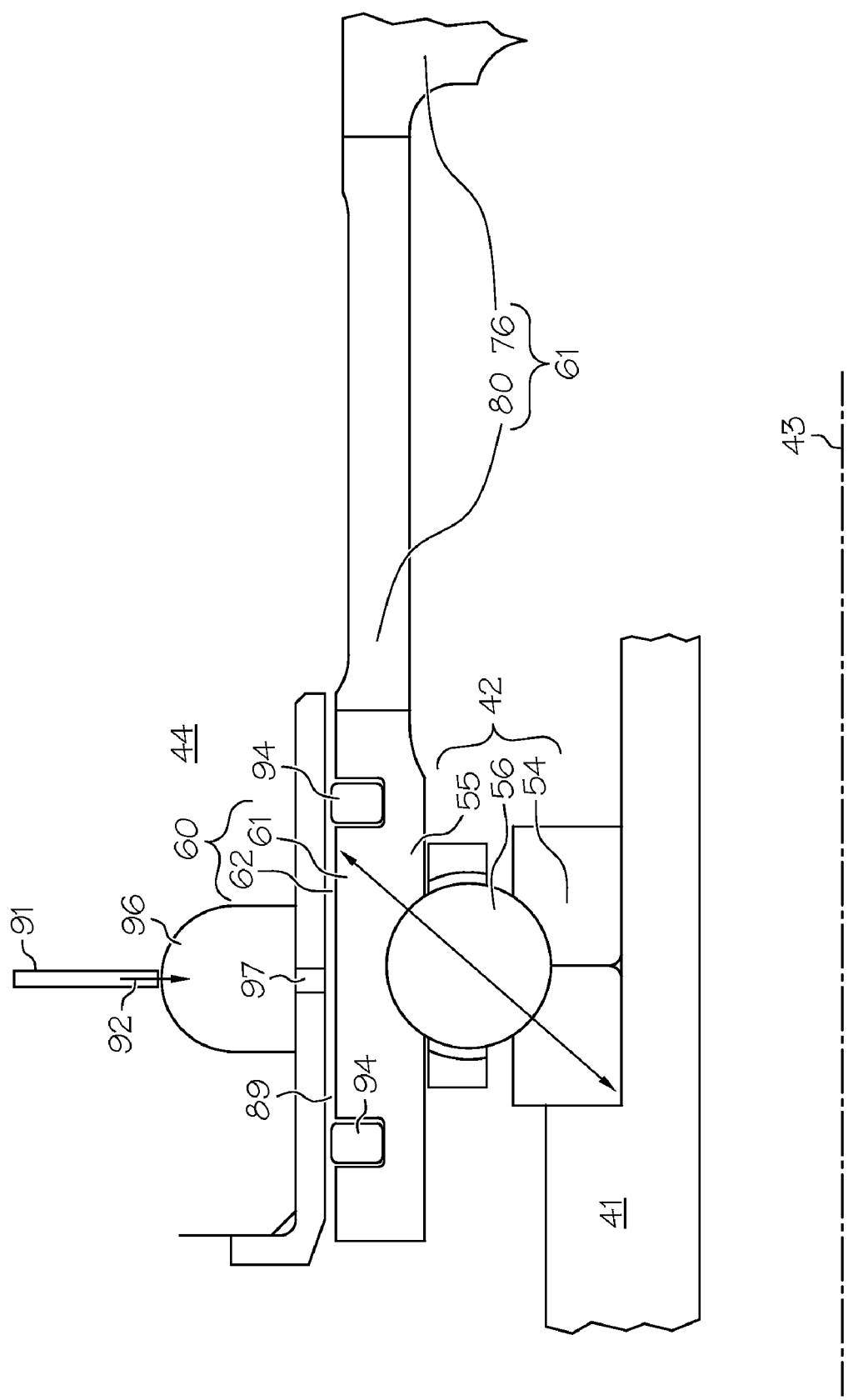
FIG. 4 is a plan view of a rotor mount assembly having a tube spring integral to a bearing assembly according to one embodiment of the present invention.

In some embodiments, the spring member 61 may include a flange portion 76 positioned at one end of the annular structure 80, as depicted in FIGS. 2a, 2b and 4 (tube spring). For some embodiments comprising the tube spring, as depicted in FIGS. 2a and 2b, the annular structure 80 may be positioned radially outward from and in contact with the bearing assembly 42. In alternate tube spring embodiments, as depicted in FIG. 4, the annular structure 80 may be integral to the outer race 55 of the bearing assembly 42. The annular structure 80 may support the bearing assembly 42. The flange portion 76, as depicted in FIGS. 2a and 2b, may be fixed to the support housing 44 by, for example, a bolt 77.

The bearing assembly 42 may be cantilevered from the support housing 44 in the tube spring. Under bearing load the annular structure 80 may bend and may provide a modifying stiffness. A radial thickness 79 (see Figure 2a) and an axial length 78 (see FIG. 2a) of the annular structure 80 may be factors in determining the stiffness of the spring member 61. The dimensions of the annular structure 80 may vary with application and may depend on factors including the dimensions of the bearing assembly 42 and the mass of the main rotor shaft 41. For some tube spring embodiments, the annular structure 80 may have a radial thickness 79 of between about 0.635 millimeters (mm), 0.025 inches and about 12.7 mm, 0.500 inches. For some tube spring embodiments, the annular structure 80 may have an axial length 78 of between about 2.54 mm, 0.10 inches and about 12.7 centimeters (cm), 5.00 inches.

For some tube spring embodiments, the annular structure 80 may include a plurality of longitudinal openings (not shown) to vary the stiffness of the annular structure 80. The openings may be symmetrically arranged about the circumference of the annular structure 80. Alternatively, the openings may be positioned in a non-symmetric arrangement to provide anisotropy to the rotor mount assembly 60. Useful tube springs may include the tube springs described in U.S. patent application Ser. No. 11/566,881 filed on Dec. 5, 2006 entitled "High Speed Generator Resilient Mount", which is incorporated herein by reference.

In lieu of the tube spring design, alternate embodiments of the spring member 61 may comprise a ring spring design, as depicted in FIG. 5 (lobed centering ring). In these embodiments, the spring member 61 may comprise the annular structure 80, a plurality of inner lobes 81 and a plurality of outer lobes 82. The inner lobes 81 may be integral to and positioned radially inward from the annular structure 80. The outer lobes 82 may be integral to and positioned radially outward from the annular structure 80. The dimensions of the inner and outer lobes 81, 82 may vary with application. For some aircraft generator applications the inner and outer lobes 81, 82 each may have a lobe radial height 86 (see FIG. 5) of between about 0.127 mm, 0.005 inches and about 6.35 mm, 0.250 inches.

As depicted in FIG. 5, a lobe axial width 87 of the inner and outer lobes 81,82 may be about equal to the axial length 78 of the annular structure 80. In alternate embodiments, as depicted in FIG. 8a, the axial width 87 of the outer lobes 82 may be less than the axial length 78 the annular structure 80. In these embodiments, two outer lobes 82 may be positioned such that one outer lobe 82 is at a first edge 84 of the annular structure 80 and the other outer lobe 82 is at a second edge 85 of the annular structure 80 and positioned such that they are axially in-line, forming a channel 88 between the outer lobes 82, as depicted in FIG. 8a. Embodiments including the channel 88 may provide more uniform damping when compared to other ring spring designs because the SFD 62 may be formed in the channel 88.

For some ring spring designs, the axial length 78 of the annular member 80 may be about equal to the axial length of the bearing assembly 42, as depicted in FIG. 6a. For some ring spring designs, such as embodiments including the channel 88, the axial length 78 of the annular member 80 may be greater than the axial length of the bearing assembly 42, as depicted in FIG. 8a.

The inner and outer lobes 81,82 may be alternated around the circumference of the annular structure 80 to form spring elements (ring segments 83) between the lobes 81,82. Each ring segment 83 may be an arc shaped portion of the annular structure 80 extending from the center of one inner lobe 81 to the center of the adjacent outer lobe 82. The alternating arrangement of inner and outer lobes 81,82 may allow the ring segments 83 to deflect during the operation of the electrical machine (e.g. generator 40). Although the embodiment shown in FIG. 5 comprises three inner lobes 81 and three outer lobes 82, the present invention may comprise any number of lobes 81,82. The inner and outer lobes 81,82 may be arranged symmetrically forming ring segments 83 of equivalent circumferential length, as depicted in FIG. 5. In alternate embodiments (not depicted), the inner and outer lobes 81,82 may be arranged asymmetrically, forming ring segments 83 of varying circumferential length, to provide anisotropic stiffness to the spring member 61.

For embodiments comprising ring spring designs, the radial thickness 79 (see FIG. 5) and the axial length 78 (see FIG. 5) of the annular structure 80 along with the number of inner and outer lobes 81, 82 may determine the stiffness of the spring member 61. The dimensions of the annular structure 80 may vary with application and may depend on factors including the dimensions of the bearing assembly 42 and the mass of the main rotor shaft 41. For some ring spring embodiments, the radial thickness 79 of the annular structure 80 may be between about 0.635 mm, 0.025 inches and about 6.35 mm, 0.250 inches. For some ring spring embodiments, the axial length 78 of the annular structure 80 may be between about 2.54 mm, 0.10 inches and about 6.4 cm, 2.50 inches. Because the stiffness of the annular structure 80 may be a function of the circumferential length of the ring segment 83, the annular structure 80 may be designed to have a lower stiffness in one direction, for example the horizontal direction, than in another direction, for example the vertical direction. The vertical and horizontal directions may be defined with reference to the direction of the force of gravity on the installed main rotor shaft 41, with vertical being about parallel to gravity. The placement of the lobes 81, 82 in a non-symmetric fashion may provide anisotropy to the rotor mount assembly 60. This anisotropy may provide beneficial cross-coupling stiffness to counteract instability of the main rotor shaft 41 arising from both bearing loads and shaft deflections. Useful spring members 61 having a ring spring design may include the ring springs described in U.S. Patent Application Ser. No. 11/566,881 filed on Dec. 5, 2006 entitled "High Speed Generator Resilient Mount", which is incorporated herein by reference.

The spring member 61 may be in contact with the squeeze film damper 62 (SFD). The SFD 62 may be formed by a gap (spring/housing interface gap 89) between the inner diameter surface of the support housing 44 and the outer diameter surface of the spring member 61, as depicted in FIGS. 2a and 2b. Although the dimensions of the spring/housing interface gap 89 may vary, for some aircraft applications the spring/housing interface gap 89 may have a radial height of between about 0.0254 mm, 0.001 inches and about 1.27 mm, 0.050 inches. For embodiments wherein the SFD 62 is formed by the spring/housing interface gap 89, a supply of oil 92 may be in contact with the radially outward surface of the spring member 61 and the radially inward surface of the support housing 44. The compression of the oil 92 between the support housing 44 and the outer diameter surface of the spring member 61 may provide the damping.

Alternatively, the SFD 62 may be formed by a gap (bearing/housing interface gap 90) between the inner diameter surface of the support housing 44 and the outer diameter surface of bearing assembly 42, as depicted in FIGS. 6a and 6b. In these embodiments, the oil 92 could be introduced around the spring member 61, circulating between and beneath the inner and outer lobes 81, 82. The compression of the resulting oil film between the inner lobes 81 and the bearing outer race 55 and between the outer lobes 82 and the support housing 44 may provide the required damping. Although the dimensions of the bearing/housing interface gap 90 may vary, for some aircraft applications the bearing/housing interface gap 90 may have a radial height of between about 0.127 mm, 0.005 inches and about 1.27 mm, 0.050 inches. The radial height of the bearing/housing interface gap 90 may be less than or equal to the radial outer lobe 82 height of the spring member 61. For some embodiments wherein the SFD 62 is formed by the bearing/housing interface gap 90, the oil 92 may be in contact with both the radially inward surface and the radially outward surface of the spring member 61. In these embodiments, the compression of the oil 92 between the support housing 44 and the outer diameter surface of the spring member 61 along with compression of the oil 92 between the bearing assembly 42 and the inner diameter surface of the spring member 61 may provide the damping.

An inlet line 91 to feed the supply of oil 92 to the gap (spring/housing interface gap 89 or bearing/housing interface gap 90) may be included in the support housing 44. The inlet line 91 may be in flow communication with the gap 89, 90. For some embodiments, as depicted in FIG. 4, the inlet line 91 may include an oil supply annulus 96 and a plurality of feed holes 97 to distribute the oil 92 to the gap 89 (or to the gap 90—not depicted). The inlet line 91 may provide a center feed, as depicted in FIGS. 2a, 2b and 4. A center feed may comprise an inlet line 91 that supplies the oil 92 to the gap 89,90 at a position that is radially outward from and towards the axial center of the bearing assembly 42. Alternatively, the inlet line 91 may provide an end feed, as depicted in FIGS. 3a, 6a and 7a. An end feed may comprise an inlet line 91 that supplies the oil 92 to the gap 89, 90 at a position that is radially outward from and towards the axial ends of the bearing assembly 42. The axial center and axial ends of the bearing assembly 42 may be defined with reference to an axial line 43 (see FIG. 1) through the main rotor shaft 41.

For some embodiments, the SFD 62 may comprise an open ended mount. For these embodiments, the oil 92 may exit the gap 89,90 as leakage 93, as depicted in FIGS. 2a, 3a, 6a and 7a. In alternate embodiments, as depicted in FIGS. 2b and 4, the SFD 62 may comprise a restricted ended mount. For these embodiments, the SFD 62 may include at least one piston ring 94 positioned between and in contact with the spring member 61 and the support housing 44. The piston rings 94 may be used to seal the gap 89, 90 of the SFD 62.

Figure 7B:
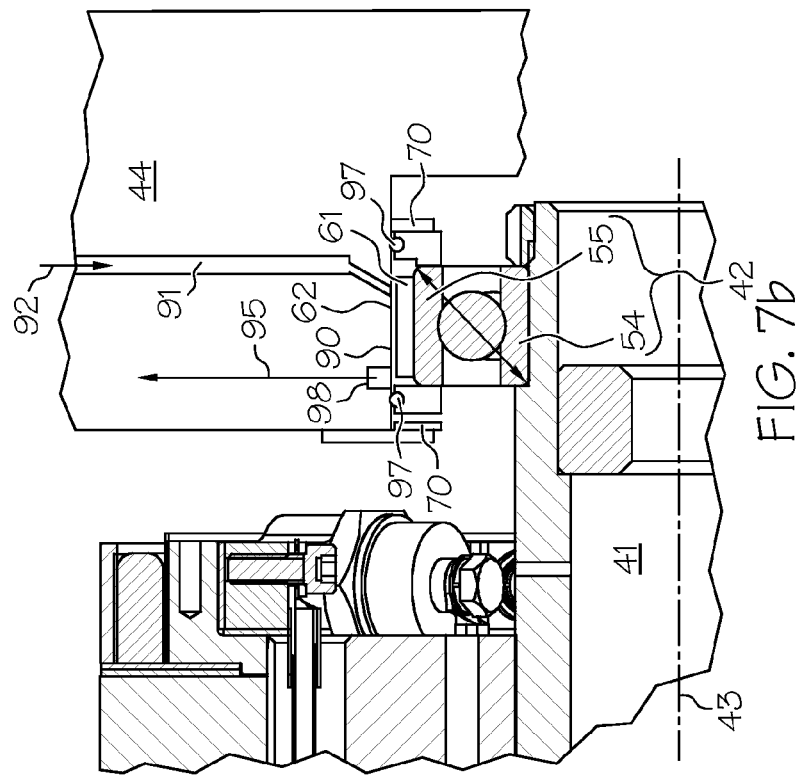
FIG. 7b is a plan view of a rotor mount assembly having a lobed centering spring and re-circulating end feed mount with an axial spring on the bearing according to one embodiment of the present invention.
Figure 7A:
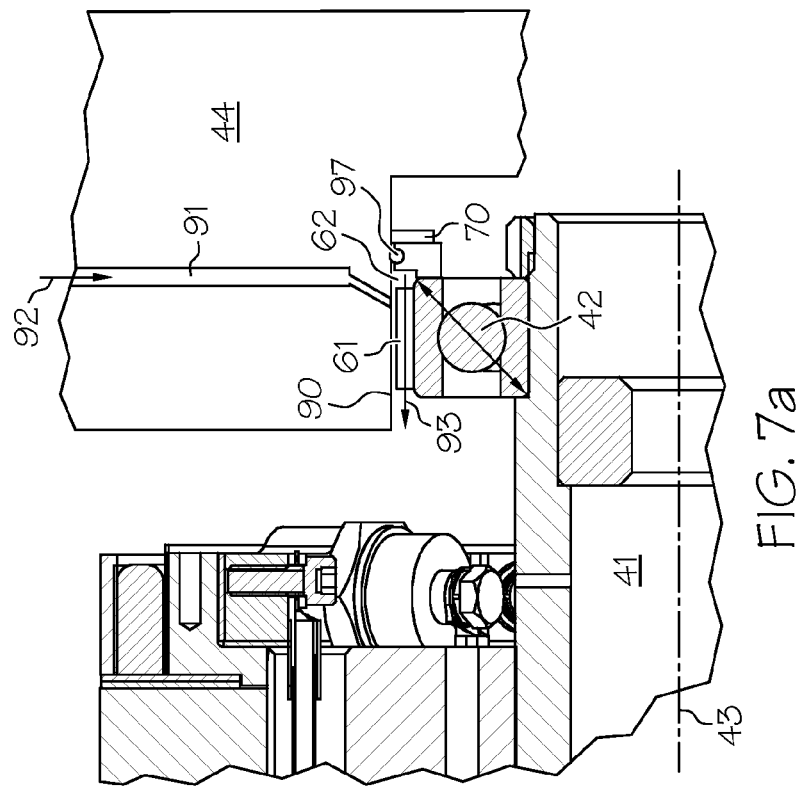
FIG. 7a is a plan view of a rotor mount assembly having a lobed centering spring and an open end feed mount with an axial spring on the bearing according to one embodiment of the present invention.

In other alternative embodiments, as depicted in FIGS. 3b, 6b and 7b, the SFD 62 may comprise a recirculating mount. For these embodiments, an outlet line 95 may be included in the support housing 44 to re-circulate the supply of oil 92. The outlet line 95 may be in flow communication with the gap 89, 90. Piston rings 94 and/or o-rings 97 also may be included to seal the gap 89, 90. The oil 92 may exit the gap (spring/housing interface gap 89 or bearing/housing interface gap 90) through the outlet line 95. The outlet line 95, as depicted in FIGS. 6b and 7b, may include an oil outlet annulus 98 and a plurality of outlet holes (not shown) through which the oil 92 may exit the gap 90 (or the gap 89—not depicted).

The flow rate and pressure of the oil 92 of the SFD 62 may vary with the embodiment and with the application. For example, for some aircraft motor applications having an open ended mount, the flow rate of the oil 92 may be between about 0.10 GPM and about 2.5 GPM. For some aircraft generator applications having a restricted ended mount, the flow rate of the oil 92 may be between about 0.01 GPM and about 1.0 GPM. Useful SFD 62 may include the SFDs described in U.S. Pat. No. 6,747,383, entitled "Generator with Hydraulically Mounted Stator Rotor", which is incorporated by reference herein.

Figure 9:
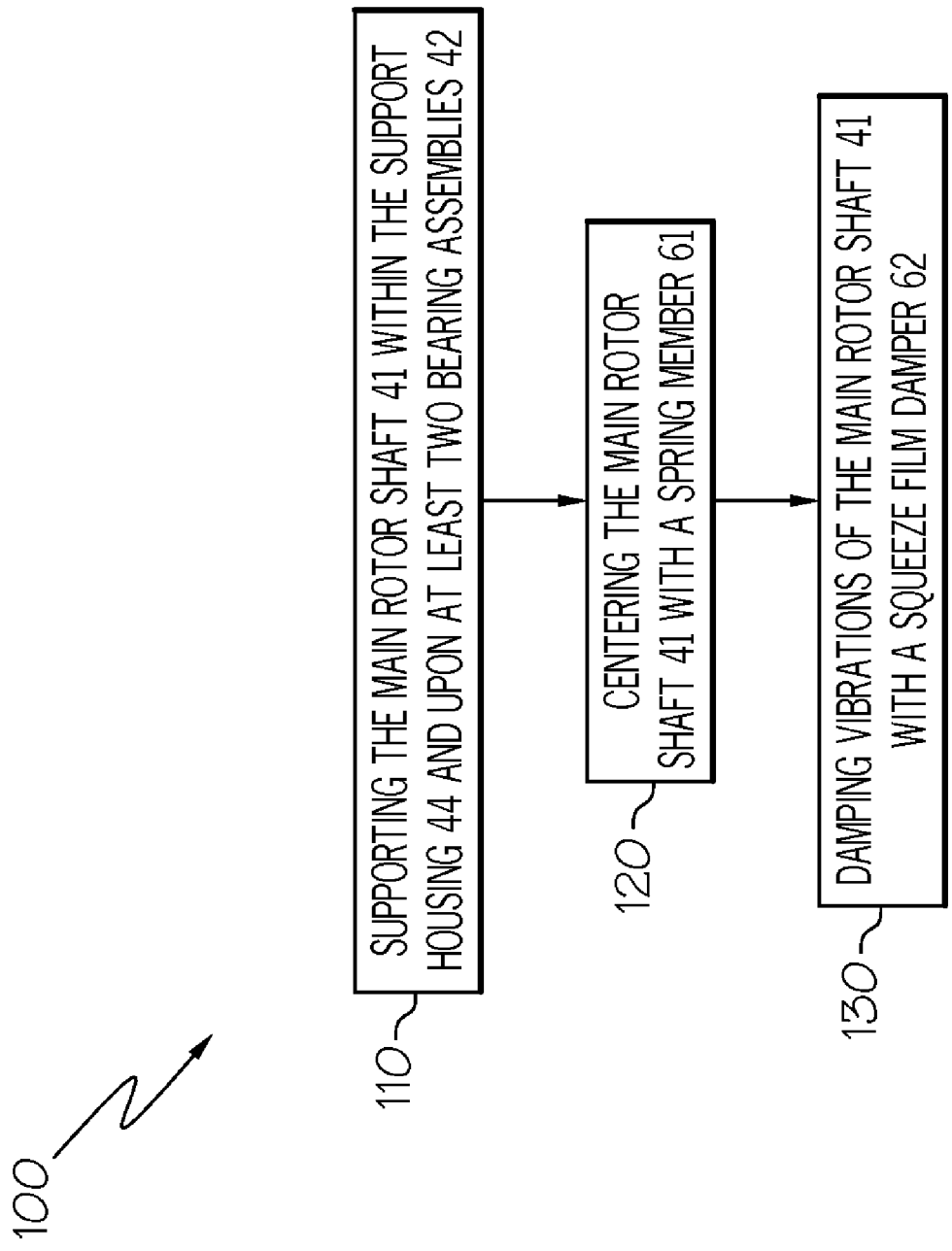
FIG. 9 is a flow chart of a method of rotatably supporting a main rotor shaft within a support housing according to an embodiment of the present invention.

A method 100 for rotatably supporting a main rotor shaft 41 within a support housing 44 is depicted in FIG. 9. The method 100 may comprise a step 110 of supporting the main rotor shaft 41 within the support housing 44 and upon at least two bearing assemblies 42. The step 110 of supporting the main rotor shaft 41 within the support housing 44 and upon at least two bearing assemblies 42 may comprise positioning the main rotor shaft 41 of a high speed aerospace generator within a generator housing and upon at least two axially loaded bearing assemblies.

The method 100 may comprise a step 120 of centering the main rotor shaft 41 with a spring member 61. The step 120 of centering the main rotor shaft 41 with a spring member 61 may comprise positioning an annular structure of a tube spring around the outer race 55 of the bearing assembly 42 and bolting a flange 76 of the tube spring to the support housing 44. Alternatively, the step 120 of centering the main rotor shaft 41 with a spring member 61 may comprise positioning a ring spring around the outer race 55 of the bearing assembly 42.

The method 100 may comprise a step 130 of damping vibrations of the main rotor shaft 41 with a squeeze film damper 62. The step 130 of damping vibrations of the main rotor shaft 41 with a squeeze film damper 62 may comprise feeding a supply of oil 92 to a spring/housing interface gap 89 between the support housing 44 and the spring member 61. Alternatively, the step 130 of damping vibrations of the main rotor shaft 41 with a squeeze film damper 62 may comprise feeding a supply of oil 92 to a bearing/housing interface gap 90 between the bearing assembly 42 and the support housing 44.

EXAMPLE 1

A spring member 61 having a tube spring design can be bolted to a support housing, as depicted in FIGS. 2a and 2b. In these embodiments, the inlet line 91 provides a center feed. The embodiment in FIG. 2a has an open ended mount and the embodiment in FIG. 2b includes two piston rings 94 to form a restricted ended mount. The embodiments in FIGS. 2a and 2b both include an axial spring 70 to provide axial loading to the bearing pair.

EXAMPLE 2

A spring member 61 having a tube spring design can be bolted to a support housing, as depicted in FIGS. 3a and 3b. In these embodiments, the inlet line 91 provides an end feed. The embodiment in FIG. 3a has an open ended mount and the embodiment in FIG. 3b has a recirculating mount. The embodiments in FIGS. 3a and 3b do not provide axial loading to the bearing pair, and the bearing pair is loaded by from a spring on the other bearing (not shown). An axial load may be provided by placement of a spring between a retainer 99 and the outer race 55 of the bearing 42. The retainer 99 may comprise a support structure fixed to the housing 44.

EXAMPLE 3

A spring member 61 having a tube spring design can be bolted to a support housing, as depicted in FIG. 4. In this embodiment, the spring member 61 is integral to the outer race of the bearing assembly 42. In this embodiment, the inlet line 91 provides a center feed. This embodiment includes two piston rings 94 to form a restricted ended mount. The embodiment in FIG. 4 does not provide axial loading to the bearing pair.

EXAMPLE 4

A spring member 61 having a ring spring design can be positioned between the support housing 44 and the bearing assembly 42, as depicted in FIGS. 6a and 6b. In these embodiments, the inlet line 91 provides an end feed. The embodiment in FIG. 6a has an open ended mount and the embodiment in FIG. 6b has a recirculating mount. The embodiments in FIGS. 6a and 6b do not provide axial loading to the bearing pair, and the bearing pair is loaded by a spring on the other bearing (not shown). An axial load may be provided by placement of a spring between the retainer 99 and the outer race 55 of the bearing 42.

EXAMPLE 5

A spring member 61 having a ring spring design can be positioned between the support housing 44 and the bearing assembly 42, as depicted in FIGS. 7a and 7b. In these embodiments, the inlet line 91 provides an end feed. The embodiment in FIG. 7a has an open ended mount and the embodiment in FIG. 7b has a recirculating mount. The embodiments in FIGS. 7a and 7b both include at least one axial spring 70 to provide axial loading to the bearing pair.

EXAMPLE 6

Figure 8B:
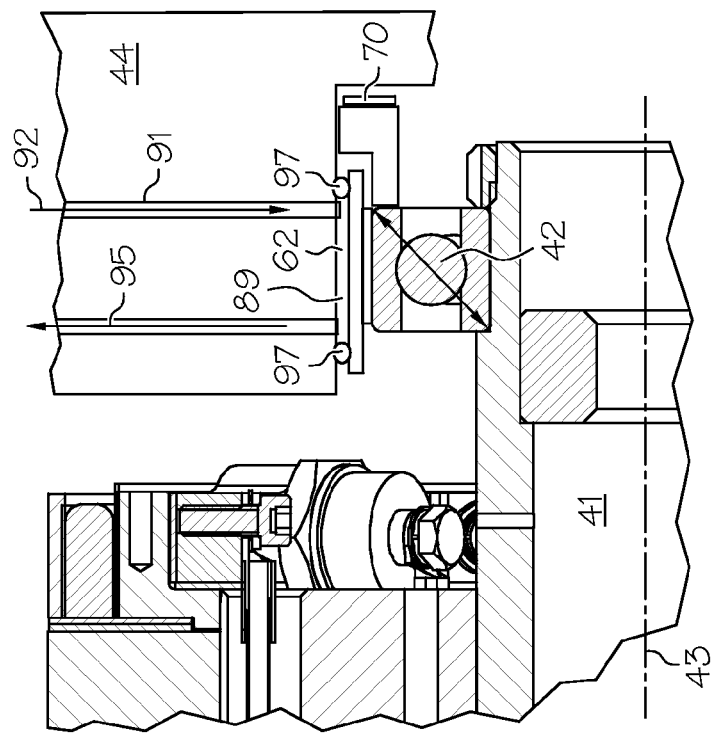
FIG. 8b is a plan view of a rotor mount assembly having a lobed centering spring and a re-circulating end feed mount according to one embodiment of the present invention.
Figure 8A:
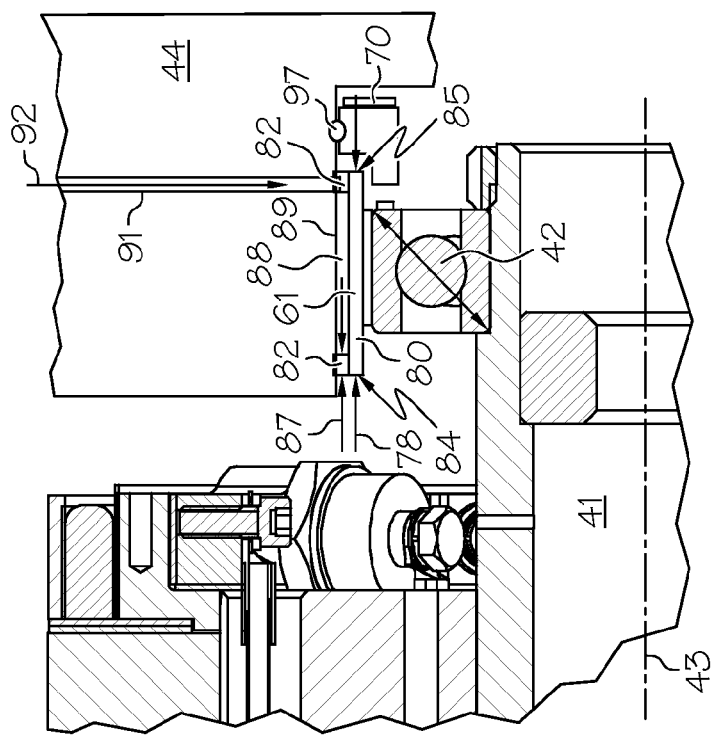
FIG. 8a is a plan view of a rotor mount assembly including a lobed centering spring with a channel and an open end feed mount according to one embodiment of the present invention.

A spring member 61 having a ring spring design can be positioned between the support housing 44 and the bearing assembly 42, as depicted in FIGS. 8a and 8b. In these embodiments, the inlet line 91 provides an end feed. The embodiment in FIG. 8a has an open ended mount and the embodiment in FIG. 8b has a recirculating mount. The embodiments in FIGS. 8a and 8b both include at least one axial spring 70 to provide axial loading to the bearing pair. In these embodiments, the axial width of the annular member 80 is greater than the axial width of the bearing assembly 42. The embodiment in FIG. 8a includes axially in-line outer lobes 82 that form a channel 88 for the oil 92. The embodiment in FIG. 8b includes a pair of o-rings 97 to seal the spring/housing interface gap 89. The embodiments of FIGS. 8a and 8b may provide increased damping because the axial width of the spring/housing interface gap 89 may be increased.

As can be appreciated by those skilled in the art, embodiments of the present invention provide improved mounts for high speed aerospace generators. Embodiments of the present invention provide simple mechanical springs together with SFDs to move the rotor critical speeds outside of the extremes of the operating speed range and to damp out the rotor responses as the speed passes through these points.

It should be understood, of course, that the foregoing relates to exemplary embodiments of the invention and that modifications may be made without departing from the spirit and scope of the invention as set forth in the following claims.

We claim:

1. An assembly for an electric machine having a rotor shaft, a bearing assembly and a support housing comprising:
   a spring member, said spring member having an annular structure that receives said bearing assembly;
   a supply of oil that forms a squeeze film damper for said rotor shaft, said supply of oil in contact with said annular structure;
   wherein said spring member further comprises a plurality of inner lobes and a plurality of outer lobes, said inner lobes integral to and positioned radially inward from said annular structure, said outer lobes integral to and positioned radially outward from said annular structure; and
   wherein a lobe axial width of said outer lobes is less than an axial length of said annular structure, said outer lobes positioned such that one outer lobe is at a first edge of said annular structure and another outer lobe is at a second edge of said annular structure, said outer lobes positioned axially in-line such that a channel is formed.

2. The assembly of claim 1, wherein said squeeze film damper is formed in the channel.

3. The assembly of claim 1, wherein said annular structure includes a plurality of longitudinal openings positioned symmetrically about the circumference of said annular structure.

4. The assembly of claim 1, wherein said annular structure includes a plurality of longitudinal openings positioned asymmetrically about the circumference of said annular structure.

5. The assembly of claim 1, wherein said supply of oil is in contact with an inner diameter surface of said annular structure and in contact with an outer diameter surface of said annular structure.

6. The assembly of claim 1, wherein said inner lobes and said outer lobes are arranged symmetrically such that a plurality of ring segments of equivalent circumferential length are formed.

7. The assembly of claim 1, wherein said inner lobes and said outer lobes are arranged asymmetrically such that a plurality of ring segments of varying circumferential length are formed.

8. An assembly for an electric machine having a rotor shaft, a bearing assembly and a support housing comprising:
- a tube spring having an annular structure with a plurality of inner lobes and a plurality of outer lobes, said inner lobes integral to and positioned radially inward from said annular structure, said outer lobes integral to and positioned radially outward from said annular structure, said annular structure positioned radially outward from said bearing assembly;
- an axial spring positioned between the bearing assembly and the support housing for providing axial loading; and
- a squeeze film damper formed by a gap between an inner diameter surface of said support housing and an outer diameter surface of said annular structure.

9. The assembly of claim 8, further comprising an inlet line through said support housing and in flow communication with said gap, said inlet line designed to provide a supply of oil to said gap.

10. The assembly of claim 9, wherein said inlet line includes an oil supply annulus and a plurality of feed holes adapted to distribute said supply of oil.

11. An assembly for an electric machine having a rotor shaft, a bearing assembly and a support housing comprising:
- a ring spring comprising an annular structure, a plurality of inner lobes and a plurality of outer lobes, said inner lobes integral to and positioned radially inward from said annular structure, said outer lobes integral to and positioned radially outward from said annular structure;
- the bearing assembly having an outer race with a first axial width;
- the ring spring being in contact with the outer race;
- the ring spring having a second axial width greater that the first axial width of the outer race; and
- a supply of oil in contact with said ring spring such that a squeeze film damper is formed between the ring spring and the support housing.

12. The assembly of claim 11, further comprising an outlet line through said support housing and in flow communication with said squeeze film damper, said outlet line designed to re-circulate said supply of oil.

13. The assembly of claim 11, further comprising an inlet line through said support housing and designed to provide an end feed such that said supply of oil is provided to a position radially outward from and towards the axial ends of said bearing assembly.

* * * * *

UNITED STATES PATENT AND TRADEMARK OFFICE
CERTIFICATE OF CORRECTION

PATENT NO.        : 7,648,278 B2
APPLICATION NO. : 11/620287
DATED             : January 19, 2010
INVENTOR(S)       : Stout et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Sixteenth Day of November, 2010

David J. Kappos
*Director of the United States Patent and Trademark Office*